(12) United States Patent
Bayerl (10) Patent No.: US 7,086,230 B2
(45) Date of Patent: Aug. 8, 2006

(54) POP-OFF VALVE FOR AN AIRCRAFT ENGINE HAVING A TURBOCHARGER CONTROL SYSTEM AND PROPELLER CONTROL SYSTEM BY STEPPER MOTOR

(75) Inventor: Johann Bayerl, Gunskirchen (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 70 days.

(21) Appl. No.: 10/787,247

(22) Filed: Feb. 27, 2004

(65) Prior Publication Data

US 2004/0255580 A1 Dec. 23, 2004

Related U.S. Application Data

(60) Continuation-in-part of application No. 10/636,627, filed on Aug. 8, 2003, now Pat. No. 6,938,418, which is a division of application No. 09/933,117, filed on Mar. 16, 2002, now Pat. No. 6,637,202.

(60) Provisional application No. 60/449,874, filed on Feb. 27, 2003, provisional application No. 60/226,579, filed on Aug. 21, 2000.

(51) Int. Cl.
    F02B 33/44    (2006.01)
    F02B 37/00    (2006.01)
    F02B 37/10    (2006.01)
    F02B 77/00    (2006.01)
    F02B 37/16    (2006.01)
    F02D 23/00    (2006.01)
    F02D 23/02    (2006.01)
    F16K 17/04    (2006.01)
    F03D 1/00     (2006.01)

(52) U.S. Cl. .................. 60/602; 60/600; 60/611; 123/564; 123/565

(58) Field of Classification Search .............. 60/600, 60/602, 605.1, 611; 123/564, 565; 416/27, 416/47, 48, 50
See application file for complete search history.

(56) References Cited

U.S. PATENT DOCUMENTS

| 4,476,682 A | * | 10/1984 | McInerney ............... 60/602 |
| 4,626,170 A | | 12/1986 | Dorsch .................. 416/30 |
| 4,645,420 A | | 2/1987 | Warner ................. 416/50 |
| 5,299,911 A | | 4/1994 | Moriya ................. 416/35 |
| 5,417,193 A | | 5/1995 | Fillman et al. ............ 123/352 |
| 5,549,089 A | | 8/1996 | Snell et al. .............. 123/352 |
| 5,577,487 A | | 11/1996 | Ohtake et al. ............ 123/674 |

(Continued)

FOREIGN PATENT DOCUMENTS

DE    31219686    2/1983

(Continued)

Primary Examiner—Sheldon J Richter
(74) Attorney, Agent, or Firm—Osler, Hoskin & Harcourt LLP (57) ABSTRACT

A pop-off valve that, in one embodiment, provides overboost protection for an aircraft engine, is described. The pop-off valve includes a housing adapted for connection to a portion of a drive device containing a pressure medium. It also includes a pressure body movably disposed in the housing such that, in operation, a first side of the pressure body is exposed to the pressure medium while a second side is exposed to a reference force. In addition, the pop-off valve incorporates a control device adapted to receive at least one signal concerning at least one operating parameter of the drive device and, in response to the operating parameter signal, to control the reference force. As a result of movement of the pressure body within the housing, at least one first opening in the housing is exposed, permitting venting of the pressure medium.

29 Claims, 8 Drawing Sheets

U.S. PATENT DOCUMENTS

| | | | |
|---|---|---|---|
| 5,810,560 A | 9/1998 | Tanaka ........................ | 416/27 |
| 5,829,254 A | 11/1998 | Hayashi et al. ............... | 60/602 |
| 6,076,352 A | 6/2000 | Hayashi ....................... | 60/602 |
| 6,077,040 A | 6/2000 | Pruden et al. ................ | 416/50 |
| 6,171,055 B1 | 1/2001 | Vos et al. .................... | 416/27 |
| 6,178,748 B1 * | 1/2001 | Oleksiewicz ................. | 60/602 |
| 6,224,021 B1 | 5/2001 | Tanaka ....................... | 244/221 |
| 6,276,139 B1 * | 8/2001 | Moraal et al. ................ | 60/611 |
| 6,295,816 B1 * | 10/2001 | Gallagher et al. ............ | 60/611 |
| 6,457,312 B1 * | 10/2002 | Fahringer et al. ............ | 60/611 |
| 6,722,128 B1 * | 4/2004 | Adrian ........................ | 60/611 |
| 6,898,934 B1 * | 5/2005 | Bayer et al. ................. | 60/611 |
| 7,010,914 B1 * | 3/2006 | Roberts et al. .............. | 60/600 |

FOREIGN PATENT DOCUMENTS

| | | |
|---|---|---|
| FR | 2694341 | 2/1994 |
| GB | 460912 | 2/1937 |
| GB | 529783 | 11/1940 |
| GB | 597908 | 2/1948 |
| JP | 60192826 | 10/1985 |
| JP | 61160537 | 7/1986 |
| JP | 1238781 | 9/1989 |
| JP | 10213245 | 8/1998 |
| JP | 11255199 | 9/1999 |
| WO | WO99/51868 | 10/1999 |

* cited by examiner

POP-OFF VALVE FOR AN AIRCRAFT ENGINE HAVING A TURBOCHARGER CONTROL SYSTEM AND PROPELLER CONTROL SYSTEM BY STEPPER MOTOR

CROSS-REFERENCE TO RELATED APPLICATIONS

This application claims priority to U.S. Provisional Patent Application Ser. No. 60/449,874, entitled "A Pop-Off Valve for an Aircraft Engine Having a Turbocharger Control System Propeller Control System by Stepper Motor," which was filed on Feb. 27, 2003. In addition, this application is a Continuation-In-Part of U.S. patent application Ser. No. 10/636,627, entitled "Turbocharger Control System and Propeller Control System by Stepper Motor," which was filed on Aug. 8, 2003, and is now U.S. Pat. No. 6,938,418. That application in which is a divisional application of U.S. patent application Ser. No. 09/933,117, filed on Mar. 16, 2002, which is now U.S. Pat. No. 6,637,202. The Application that matured into U.S. Pat. No. 6,637,202 relies for priority on U.S. Provisional Patent Application No. 60/226,579, which was filed on Aug. 21, 2000. Accordingly, this application also relies indirectly on U.S. Provisional Patent Application Ser. No. 60/226,579 for priority. The contents of all four applications are incorporated herein by reference.

FIELD OF THE INVENTION

The present invention relates to a method and apparatus for controlling the turbo charging of an internal combustion engine, in particular an aircraft engine, as well as a method and apparatus for controlling an aircraft propeller. More particularly, the present invention concerns a pop-off valve for relieving pressure in a pressure medium which, in one embodiment, facilitates overboost control.

BACKGROUND OF THE INVENTION

Aircraft are controlled by a throttle control lever, which adjusts a throttle valve in the aircraft engine, and a speed control lever, which adjusts the speed of rotation of the engine and the propeller. The speed control lever controls a propeller governor. The propeller governor in turn controls a propeller pitch control mechanism. Accordingly, the governor serves to operatively couple the speed control lever to the propeller pitch control mechanism. The pitch of the propeller determines the load on the engine. As the pitch increases, the load on the engine increases. Conversely, as the pitch decreases, the load on the engine decreases.

A disadvantage of this system is that the pilot must control both the throttle control lever and the speed control lever simultaneously. Obviously, the pilot may select less than optimum speed control settings for a given throttle setting. Excess wear and tear on the engine and poor fuel efficiency may result from these less than optimal settings.

The turbo charging of internal combustion engines is usually controlled through a waste gate. The waste gate is disposed in a by-pass duct that connects a turbine inlet directly with a turbine outlet. Exhaust gasses by-pass the turbine as they pass through the by-pass duct. The position of the waste gate determines the admission of exhaust gasses to the turbine. Thus, the waste gate functions in the same way as a valve. By increasing or decreasing the admission of exhaust gas to the turbine, it is possible to influence a compressor's output. The compressor is connected to the turbine through a turbocharger shaft. The charge pressure produced by the compressor is, therefore, determined by the position of the waste gate.

In many instances, but particularly in automotive applications, the waste gate is actuated by means of a diaphragm cell that comprises a membrane that is acted upon by gas pressure, a spring that acts against the pressure exerted by the gas, and an operating rod. The operating rod forms the connection between the diaphragm and the waste gate, so that the waste gate can be opened and closed. The air charge generated by the compressor is usually used as the pressure medium within the diaphragm cell. If the gas pressure in the diaphragm cell changes, then the diaphragm and the operating rod move to a position where the force exerted by the gas and the force exerted by the spring are in equilibrium. The spring is disposed in a chamber that is vented to the atmosphere. In this way, the waste gate may be moved into various positions as a function of the gas pressure. The gas pressure is usually adjusted by an electromagnetic timing valve. The greater the opening, the higher the gas pressure (and vice versa). The timing valve itself is controlled by the Engine Control Unit (ECU).

Although this method is effective for controlling automotive applications, it is extremely problematic for applications used on aircraft engines. Should the timing valve or its control system fail, the valve may be left either fully open or fully closed, depending on the type of valve involved. This may result in the waste gate being either fully opened or fully closed. This, in turn, may result in an abrupt drop in charge pressure that may result in a loss of power. Alternatively, this may result in an increase in charge pressure, with a corresponding risk of damage to the engine. Both situations are hazardous in aircraft engine applications. In principle, excess pressure can be dissipated through special "pop-off," or alternatively, relief valves, although such valves are relatively costly.

In aircraft applications, hydraulic-mechanical control systems are normally used today in order to actuate the waste gate. In such cases, motor oil itself is usually used as the pressure medium, and this oil acts on a hydraulic actuating piston through a hydraulic-mechanical controller-logic system. The actuator piston is connected to the waste gate and thus adjusts it. However, the system is relatively costly. The relatively high weight of the system is also a disadvantage. In addition, there is no redundancy built into the system, i.e., there is no backup system that can perform system functions that may be lost in the event of a failure. A hydraulic-mechanical system is more stable than the previously described system using an electromagnetic timing valve, which controls a diaphragm cell. However, in the event of a system failure in a hydraulic-mechanical system, it cannot be excluded that under unfavourable conditions, charge pressure could tend towards an extreme value, and this eventuality is associated with the dangers discussed heretofore.

SUMMARY OF THE INVENTION

It is, therefore, an object of the present invention to provide a simple, cost-effective propeller governor having improved characteristics.

It is another object of the invention to provide a simple, cost-effective turbocharger system having improved characteristics.

It is yet another object of the invention to provide an aircraft control system through which the operation of an aircraft can be greatly simplified.

It is yet another object of the invention to provide an aircraft control system through which the safe operation of an aircraft can be enhanced.

It is still another object of the invention to provide an aircraft control system through which an optimal setting for the aircraft propeller governor can be set automatically.

In furtherance of these objects, one aspect of the present invention is to provide a propeller governor that uses a stepper motor. The propeller governor is adjusted through the use of the stepper motor.

Another aspect of the present invention is to control the propeller governor through an electric control unit.

Yet another aspect of the present invention is to control the propeller governor through an electronic control unit in communication with a throttle valve. The propeller governor is adjusted in response to the position of the throttle value.

Yet another aspect of the present invention is to provide a turbocharger control system having a needle valve actuated by a stepper motor. The needle valve is configured to operatively actuate a diaphragm cell. The diaphragm cell actuates a waste gate.

Yet another aspect of the present invention is to provide a turbocharger control system having overboost protection.

Still another aspect of the present invention is to provide a pop-off valve with the control system for overboost protection.

One further aspect of the present invention provides a pop-off valve that, in one embodiment, provides overboost protection for an aircraft engine. The pop-off valve includes a housing adapted for connection to a portion of a drive device containing a pressure medium. It also includes a pressure body movably disposed in the housing such that, in operation, a first side of the pressure body is exposed to the pressure medium while a second side is exposed to a reference force. In addition, the pop-off valve incorporates a control device adapted to receive at least one signal concerning at least one operating parameter of the drive device and, in response to the operating parameter signal, to control the reference force. As a result of movement of the pressure body within the housing, at least one first opening in the housing is exposed, permitting venting of the pressure medium.

Yet another aspect of the present invention is to provide an aircraft control system having a single electronic control unit through which a propeller governor and a turbocharger are controlled.

These and other aspects of the present invention will be made apparent by the description that follows.

BRIEF DESCRIPTION OF THE DRAWINGS

Rreference will be made herein after to the accompanying drawings, which illustrate various embodiments of the present invention discussed herein below, wherein.

DETAILED DESCRIPTION OF THE PREFERRED EMBODIMENTS

Figure 1:
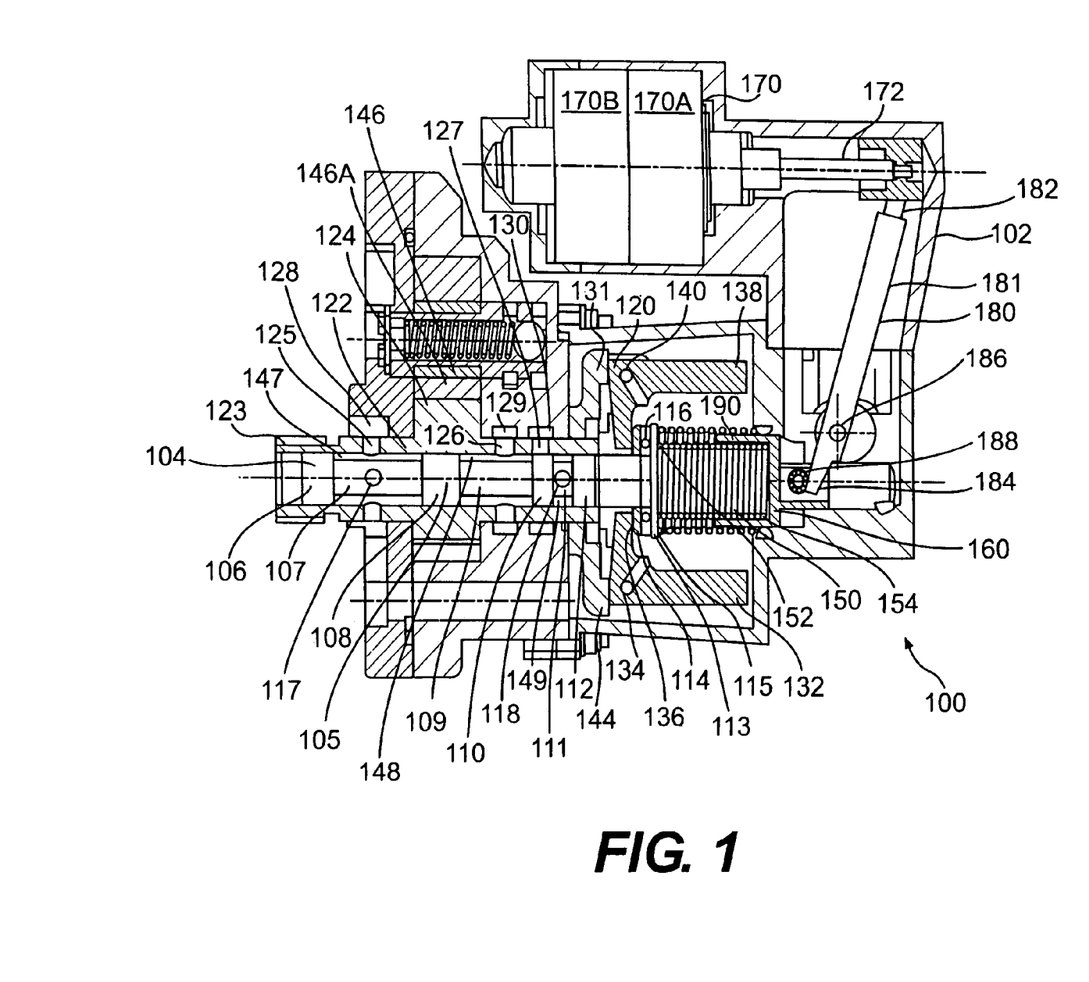
FIG. 1 is a cross-sectional side view of a propeller governor constructed in accordance with the teachings of the present invention.

FIG. 1 shows a preferred embodiment of the propeller governor 100 of the present invention. The propeller governor 100 includes a housing 102 within which a plunger valve 104 is moveably disposed. The plunger valve 104 is a hydraulic control valve through which the governor controls the oil pressure at a propeller pitch controller (not shown). The plunger valve 104 may also be referred to as a pilot valve. Unlike most of the features of the governor 100 illustrated in FIG. 1, the plunger valve 104 is almost entirely not shown in cross-section. The plunger valve includes an elongate body 105 that includes a plurality of generally cylindrical sections 106–112 connected to each other into a unitary body. A first section 106 includes a large diameter. A second section 107 includes a small diameter. A third section 108 includes a large diameter. A fourth section 109 includes a small diameter. A fifth section 110 includes a large diameter. A sixth section 111 includes a small diameter. A seventh section 112 includes a large diameter. A head 113 is connected to the elongate body seventh section 112. The head includes a bottom surface 114 and a top surface 115. A bearing assembly 116 separates the head bottom surface 114 from the head top surface 115, and allows the top surface 115 to rotate relative to the bottom surface 114. The plunger valve further includes a first orifice 117 disposed within the second cylindrical section 107, and a second orifice 118 disposed within the sixth cylindrical section 111. The first orifice 117 is in fluid communication with the second orifice 118 through a passage (not shown), which extends through the interior of the elongate body 105 of the plunger valve 104.

A rotating flyweight mechanism 120 is also disposed within the housing 102. The rotating flyweight mechanism includes an elongate body 122 which is rotationally mounted within the housing 102. The elongate body 122 includes a first end 123 which is adapted to be driven rotationally by the engine through an appropriate means such as a gear, belt, or chain (not shown). Accordingly, the flyweight mechanism 120 is responsive to engine speed (rpm) at all times. A gear 124, which extends from the elongate body, drives an oil pump comprising a toothed gear. Tooth 146 of the oil pump toothed gear is shown meshed with the gear 124. A first port 125, a second port 126, and a third port 127 each extend through the elongate body. The first port 125 is in fluid communication with a first passage 128 extending through the housing 102. The first passage 128 is in fluid communication with a sump (not shown). The second port 126 is in fluid communication with a second passage 129. The second passage 129 is in fluid communication with the pump. The third port 127 is in fluid communication with a third passage 130. The third passage 130 is in communication with the propeller pitch control mechanism.

A rotating flyweight assembly 131 is disposed on the second end of the flyweight mechanism 120. The rotating flyweight assembly includes flyweights 132, 138. The flyweight assembly 131, and, thus the flyweights 132, 138 are rotated by the engine through the first end of the flyweight mechanism 120. Accordingly, the rotational speed of the flyweights 132, 138 is responsive to engine speed (rpm) at all times. The flyweights 132, 138 include an L-shaped body. The flyweights 132, 138 pivot about pivot points 134, 140. The flyweights 132, 138 pivot outwardly as the centrifugal forces acting upon them increase, and pivot inwardly as the centrifugal forces acting upon them decrease. The flyweights 132, 138 include toe portions 136, 142 which contact the head bottom surface 114 to pull on the plunger valve 104 as the flyweights 132, 138 pivot outwardly. As the flyweights 132, 138 pull on the plunger valve 104, the plunger valve 104 is pulled, and thus moves relative to the housing 102 (to the left in FIG. 1). The flyweight assembly 131 further includes a base 144 on which pivot points 134, 140 are disposed.

A first annular gap 147 separates the plunger valve elongate body second section 107 from the elongate body 122 of the flyweight mechanism 120. A second annular gap 148 separates the plunger valve elongate body fourth section 109 from the elongate body 122 of the flyweight mechanism 120. A third annular gap 149 separates the plunger valve elongate body sixth section 111 from the elongate body 122 of the flyweight mechanism 120. The annular gaps 147, 148, and 149 comprise passages through which oil may pass.

A speeder spring 150 is disposed within the housing 102. The speeder spring 150 includes a first end 152 in contact with the head top surface 115 and a second end 154 in contact with a speeder spring cap 160 which is disposed around the speeder spring second end 154. The speeder spring 150 applies a compression force which pushes on the plunger valve 104. This compression force opposes the pulling force applied by the flyweights 132, 138.

The propeller governor 100 further includes a linear stepper motor 170 operatively adapted to apply a predetermined adjustable compression force on the speeder spring 150. The linear stepper motor 170 includes a shaft 172 which moves in a linear direction. In this preferred embodiment, the stepper motor 170 includes a first set of windings 170A and a second set of windings 170B. In this preferred embodiment, the stepper motor 170 is operatively actuated by an ECU. Each winding 170A and 170B of the stepper motor would be connected to the ECU through a separate lane. The two lanes would be galvanically isolated. The ECU is shown in greater detail in FIG. 2. The operation of the ECU will be described in greater detail in reference to FIG. 2 and FIG. 8.

A pivoting lever mechanism 180 comprises a lever arm 181 having a first end 182, a second end 184, and a pivot 186 disposed between the first end 182 and the second end 184. The pivoting lever mechanism 180 translates the movement of the stepper motor shaft 172 to the speeder spring 150. To do this, lever arm first end 182 is coupled to the stepper motor shaft 172 and the lever arm second end 184 is coupled to the speeder spring 150 through a pivot 188 disposed on the cap 160.

A compression spring 190 is disposed around the speeder spring 150. The compression spring 190 is disposed between the plunger valve 104 and the housing 102. The compression spring 190 serves to assist the stepper motor 170 in maintaining the position of the speeder spring 150.

There are three positions of the plunger valve 104 which correspond to three positions of the rotating flyweights 132, 138. These three positions are described below.

In a first steady state position shown in FIG. 1, the flyweights 132, 138 are in a neutral position, neither pivoted inwardly, nor pivoted outwardly. In this plunger valve 104 position, the passage 130, which connects the plunger valve to the propeller pitch controller is closed due to the position of the plunger valve 104 relative to the housing 102. Specifically, the plunger valve fifth section 110 is aligned with the port 127. Oil is, thus prohibited from moving from the oil pump via the passage 129, and into the passage 130. As the passage is closed, oil is also prohibited from moving through the passage 130 from the propeller pitch controller to the sump through passage 128. Accordingly, the propeller pitch control mechanism makes no adjustment to the pitch of the propeller blades, as oil is prevented from passing either to or from the propeller pitch controller through the passage 130.

In a second plunger valve 104 position (not shown), which occurs during an over-speed condition, the engine rpm and propeller speed are greater than a desired value, for example, a value determined by the ECU. As a result, the centrifugal forces acting on the rotating flyweights 132, 138 exceeds the force applied by the speeder spring 150 which opposes the centrifugal force of the rotating flyweights 132, 138. Consequently the centrifugal force acting on the flyweights 132, 138 causes the flyweights 132, 138 to pivot outwardly. The plunger valve 104 is pulled relative to the housing 102 by the outwardly pivoting flyweights 132, 138. In this plunger valve 104 position, the annular gap 148 is aligned with the ports 126 and 127. Oil is consequently allowed to pass from the oil pump to the propeller pitch controller. Specifically, oil passes from the oil pump through the second passage 129, through the second port 126, and into the annular gap 148. From the annular gap 148, the oil passes through the third port 127 into the third passage 130 which is in fluid communication with the propeller pitch controller. The oil pressure at the propeller pitch control mechanism increases resulting in a higher pitch of the propeller blades. The higher pitch of the propeller blades increases the load on the aircraft engine. Accordingly, the engine speed decreases, resulting in a decrease in the rotational speed of the rotating flyweights 132, 138. Obviously, as the rotational speed of the flyweights 132, 138 decreases, the centrifugal forces acting on the flyweights 132, 138 also decrease. The compression force of the speeder spring 150, is then able to overcome the centrifugal force acting on the flyweights 132, 138, and the speeder spring 150 pushes the plunger valve 104 back to the steady state position. The ports 121,123 through which oil traveled are closed as the plunger valve is returned to the steady state position.

In a third plunger valve 104 position (not shown), which occurs during an under-speed condition, the engine rpm and propeller speed are less than a desired value, for example, a value determined by the ECU. As a result, the centrifugal forces acting on the rotating flyweights 132, 138 are exceeded by the force applied by the speeder spring 150 which opposes the centrifugal force acting on the rotating flyweights 132, 138. Consequently the compression force of the speeder spring 150 causes the flyweights 132, 138 to pivot inwardly. The plunger valve 104 is moved relative to the housing 102 by the speeder spring 150. In this plunger valve 104 position, annular gap 149 aligns with port 127 allowing pressurized oil from the propeller pitch control mechanism to travel from the passage 130 through the port 127 into the annular gap 149. The oil in the annular gap 149 then passes through the orifice 118 into plunger valve passage (not shown). The oil passes through the plunger valve passage, through the orifice 117, and into the port 125. From the port 125, the oil passes into the passage 128, through which the oil is returned to the sump. The oil pressure at the propeller pitch control mechanism decreases resulting in a lower pitch of the propeller blades. The lower pitch of the propeller blades decreases the load on the aircraft engine. Accordingly, the engine speed increases, resulting in an increase in the rotational speed of the rotating flyweights 132, 138. Obviously, as the rotational speed of the flyweights 132, 138 increases, the centrifugal forces acting on the flyweights 132, 138 also increase. The compression force of the speeder spring 150 is overcome by the centrifugal force acting on the flyweights 132, 138, and the flyweights 132, 138 pull the plunger valve 104 back to the steady state position. The passage 130 through which oil traveled is closed as the plunger valve is returned to the steady state position.

To decrease the rotational speed of the propeller, the ECU communicates a signal to the stepper motor 170, which results in the operation of the stepper motor. The stepper motor shaft 172 is moved a distance corresponding to the signal so that the compression force on the speeder spring 150 is decreased. The decreased compression force applied by the speeder spring 150 on the plunger valve 104 allows the centrifugal forces acting on the flyweights 132, 138 to cause the flyweights to pivot outwardly and to pull the plunger valve relative to the housing 102. In this plunger valve 104 position, oil travels from the pump to the propeller pitch control mechanism in the manner previously described. The oil pressure at the propeller pitch control mechanism increases resulting in a higher pitch of the propeller blades. The higher pitch of the propeller blades increases the load on the aircraft engine. Accordingly, the engine speed decreases, resulting in a decrease in the rotational speed of the rotating flyweights 132, 138. As the rotational speed of the flyweights 132, 138 decreases, the centrifugal forces acting on the flyweights 132, 138 also decrease. The compression force of the speeder spring 150 overcomes the centrifugal force acting on the flyweights 132, 138, and the speeder spring 150 pushes the plunger valve 104 back to the steady state position.

To increase the rotational speed of the propeller, the ECU communicates a signal to the stepper motor 170, which results in the operation of the stepper motor. The stepper motor shaft 172 is moved so that the compression force on the speeder spring 150 is increased. The increased compression force applied by the speeder spring 150 on the plunger valve 104 moves the plunger valve 104 relative to the housing 102. The flyweights 132, 138 pivot inwardly as a result of the plunger valve 104 moving inwardly. In this plunger valve 104 position, oil passes from the propeller pitch controller back to the sump in the manner previously described. The oil pressure at the propeller pitch control mechanism decreases resulting in a lower pitch of the propeller blades. The lower pitch of the propeller blades decreases the load on the aircraft engine. Accordingly, the engine speed increases, resulting in an increase in the rotational speed of the rotating flyweights 132, 138. As the rotational speed of the flyweights 132, 138 increases, the centrifugal forces acting on the flyweights 132, 138 also increase. The compression force of the speeder spring 150 is overcome by the centrifugal force of the flyweights 132, 138, and the flyweights 132, 138 pull the plunger valve 104 back to the steady state position.

The propeller governor 100 described above is an increase pitch plunger valve type governor. This name of course, refers to the fact that the propeller pitch control mechanism, with which the governor operates, requires higher oil pressure to increase pitch.

There is, however, a second type of governor that is referred to as a decrease pitch plunger valve type governor. As this name suggests a governor of this type operates with a propeller pitch control mechanism for which a decrease in pitch occurs in response to higher oil pressure at the propeller pitch control mechanism. In a governor of this type, the plunger valve in the overspeed condition is lifted by the flyweights to a position where the oil in the propeller pitch control mechanism can return to the sump through the plunger valve. The decrease in oil pressure at the propeller pitch controller results in an increase in the pitch of the propeller blades. Similarly, the plunger valve in the underspeed condition is pushed by the speeder spring to a position where oil from the pump travels through the plunger valve to the propeller pitch control mechanism. The increase in oil pressure at the propeller pitch control mechanism results in the decrease in the pitch of the propeller blades. It is, therefore, understood that the features of the propeller governor illustrated in FIG. 1, and which have been described heretofore, could have also been used in a decrease pitch plunger valve type governor.

The propeller governor 100 illustrated in FIG. 1 is preferably operated by an ECU. As will be described in reference to FIG. 8, the propeller governor 100 can be integrated into a control system along with other aircraft engine components.

Although a preferred embodiment of the propeller governor 100 has been described herein, it is understood by those skilled in the art that various changes may be made and equivalents may be substituted for elements thereof without departing from the spirit and scope of the present invention. In addition many modifications may be made to adapt a particular situation, component, or material to the teachings of the present invention without departing from its teachings as claimed.

For example, the preferred embodiment of the propeller governor 100 illustrated in FIG. 1, shows the linear stepper motor 170 applying a compression force on the speeder spring through the lever mechanism 180. It is understood that the stepper motor 170 could have been mounted directly in line with the axis of the plunger valve 104 such that the stepper motor shaft 172 would apply pressure directly on the speeder spring cap 160. Also possible would be the use of other forms of known transmission mechanisms to form the connection between a stepper motor and the speeder spring. Such examples include a rotary speed adjusting control lever and adjusting worm that is known in the art. Such a governor could utilize a linear stepper motor as has been previously described, or could utilize a stepper motor having a rotary output. A suitable transmission for converting the rotary motion to a linear motion would be necessitated in this example. Such transmissions are known in the art.

Additionally, in the preferred embodiment of the propeller governor illustrated in FIG. 1, the stepper motor 170 is redundancy based, i.e., it has two electrically separated windings 170A and 170B, that are actuated by the ECU through two largely independent lanes (not shown). If one lane fails, the other lane fulfils all the control functions. Flight safety can be greatly increased as a result of this.

However, it is understood that a stepper motor that is not redundancy based could also have been used.

Figure 2:
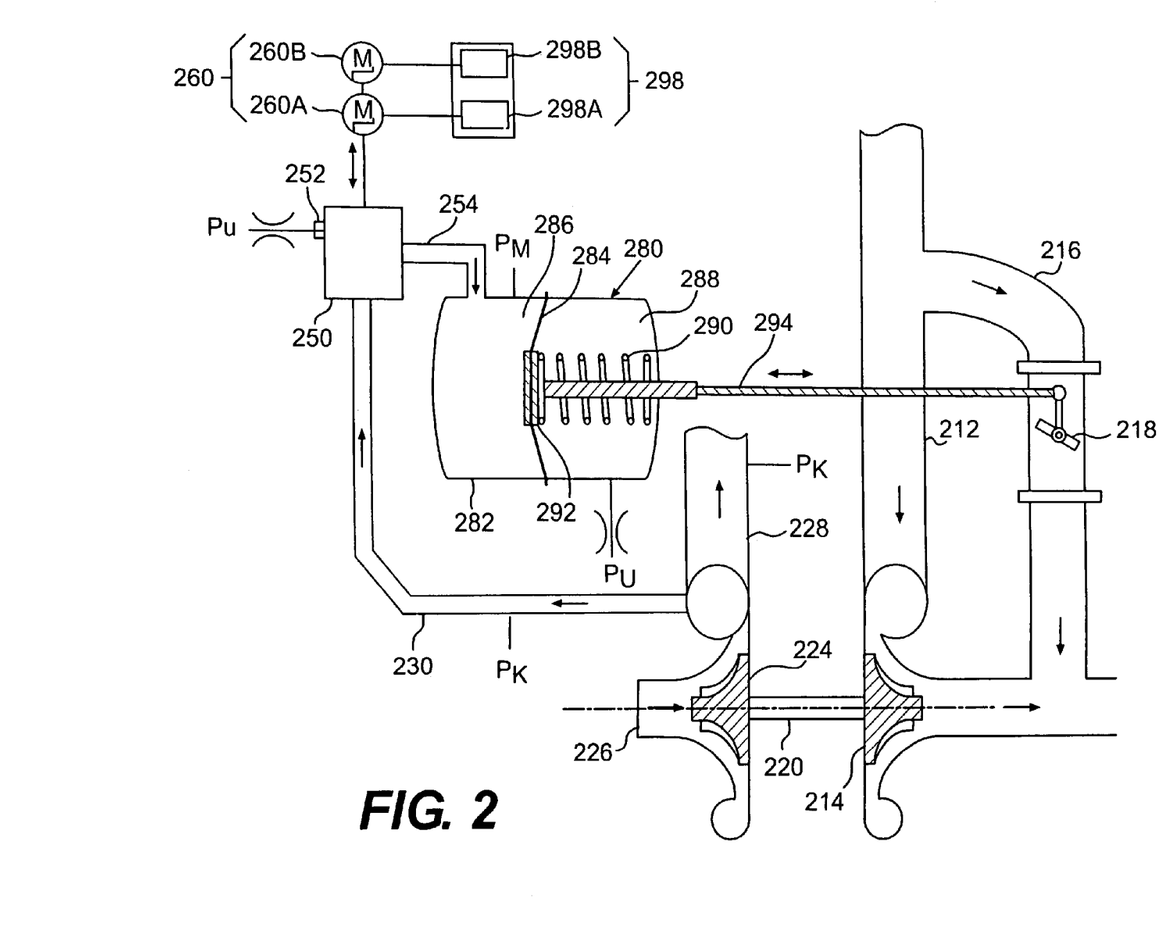
FIG. 2 is a schematic view of a turbocharger control system constructed in accordance with the teachings of the present invention with several features of the turbocharger shown in cross-section.

FIG. 2 shows the elements of the turbocharger control system 200 in a schematic view. The turbocharger control system 200 includes an exhaust duct 212, a turbine 214 disposed within the exhaust duct 212, an exhaust by-pass duct 216, and a waste gate 218 disposed within the by-pass duct 216. A shaft 220 attaches the turbine 214 to a compressor 224. The compressor 224 blows air into the air duct 228, through which pressurised air having a charge pressure $P_k$ passes to a plenum (not shown). Air passes into the compressor 224 through an air inlet 226. A charge pressure $P_k$ duct 230 extends from the air duct 228 to a needle valve mechanism 250. The needle valve mechanism 250 includes a valve needle (shown in FIGS. 3 and 4). The valve needle is operated by a stepper motor 260. The needle valve mechanism 250 includes an atmosphere passage 252, the pressure within which is at atmospheric pressure $P_u$, and a diaphragm cell passage 254. A diaphragm cell 280 is in communication with the needle valve mechanism 250 through the diaphragm cell passage 254. The diaphragm cell 280 includes a housing 282, and a diaphragm 284 which separates the housing 282 into an air chamber 286 and a coil spring chamber 288, which is vented to the atmosphere. The pressure within the air chamber 286 is $P_m$. A coil spring 290 is disposed within the coil spring chamber 288. A coil spring cap 292 or piston separates the coil spring 290 from the diaphragm 284, and provides support for the diaphragm 284. An operating rod 294 forms the connection between the diaphragm 284 and the waste gate 218, so that the waste gate 218 can be opened and closed.

Figure 3:
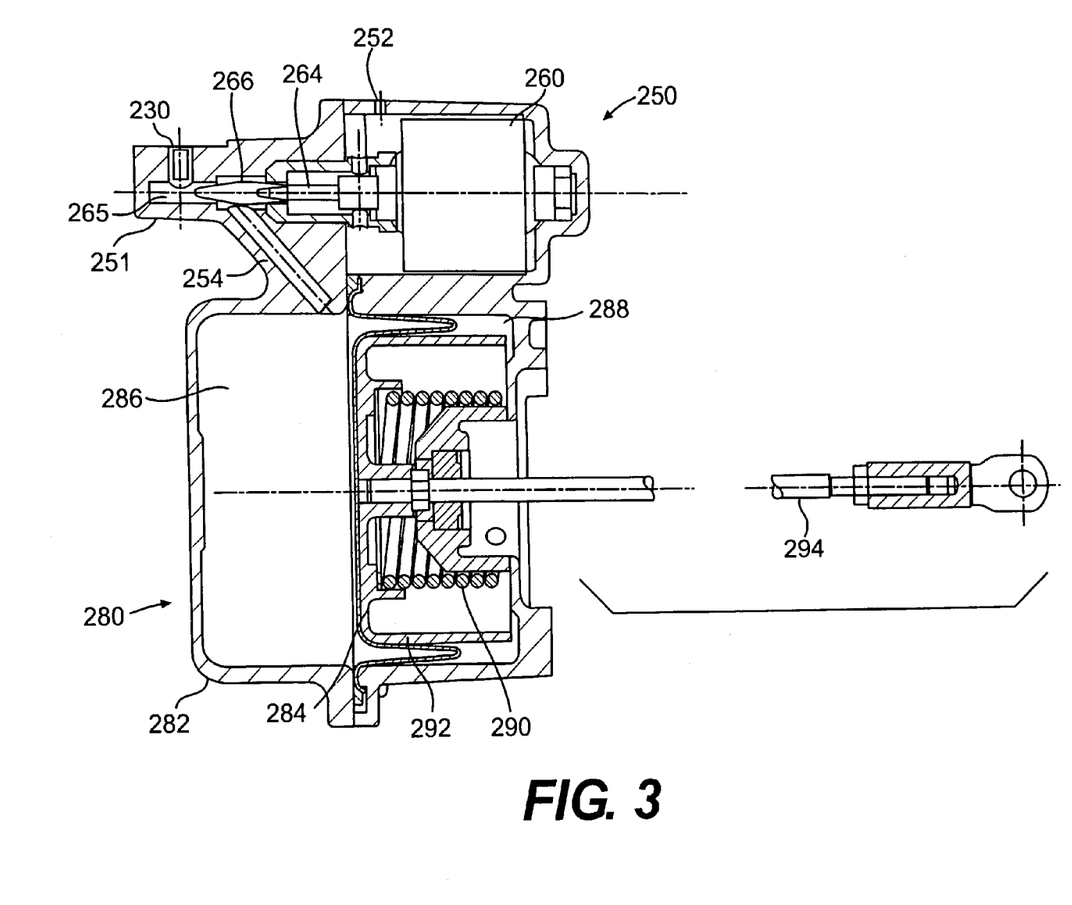
FIG. 3 is a cross-sectional side view of a portion of the turbocharger control system illustrated in FIG. 2, showing a needle valve and a diaphragm cell.

FIG. 3 shows the components of the needle valve mechanism 250 and the diaphragm cell 280. The needle valve mechanism 250 is shown having a stepper motor 260. A shaft 264 extends from the stepper motor 260. A double-conical or double-tapered valve needle 266 having opposing conical ends is secured at the end of the shaft 264 at a position opposite the stepper motor 260. The valve needle 266 is disposed within a bore 265. The valve needle 266 is disposed for linear movement within the bore 265 along the longitudinal axis of the shaft 264.

FIG. 3 also shows a preferred configuration of the diaphragm 284, coil spring cap 292 and the housing 282. The housing 282 is made in two parts. One part houses the coil spring 290, the coil spring cap 292, which is also known as the piston, and the operating arm 294, as well as the stepper motor 260. The other part contains the air chamber 286 as well as the bore 265, within which the valve needle 266 is disposed.

In use, the charge pressure $P_k$ is controlled by the waste gate 218. Depending on the position of the waste gate 218, a larger or smaller proportion of the flow of exhaust gas will be diverted from the by-pass duct 216 to the turbine 214. Accordingly, the compressor output is controlled through the waste gate 218 so that different charge pressures $P_k$ can be achieved. The waste gate 218 is adjusted by means of the diaphragm cell 280. The diaphragm 284 is acted upon by gas pressure $P_m$, and by the spring pressure exerted by spring 290 that acts opposite to the gas pressure $P_m$. Changes to the gas pressure $P_m$ result in a corresponding positional changes of the operating rod 294. If the gas pressure $P_m$ in the diaphragm cell 280 changes, then the diaphragm 284 and the operating rod 294 move to the point that the force exerted by the gas and the force exerted by the spring are once again in equilibrium. In this way, the waste gate 218 can be moved into various positions as a function of the gas pressure $P_m$.

The gas pressure $P_m$ is controlled by the needle valve 250 that is actuated by a linear stepper motor 260.

Figure 4:
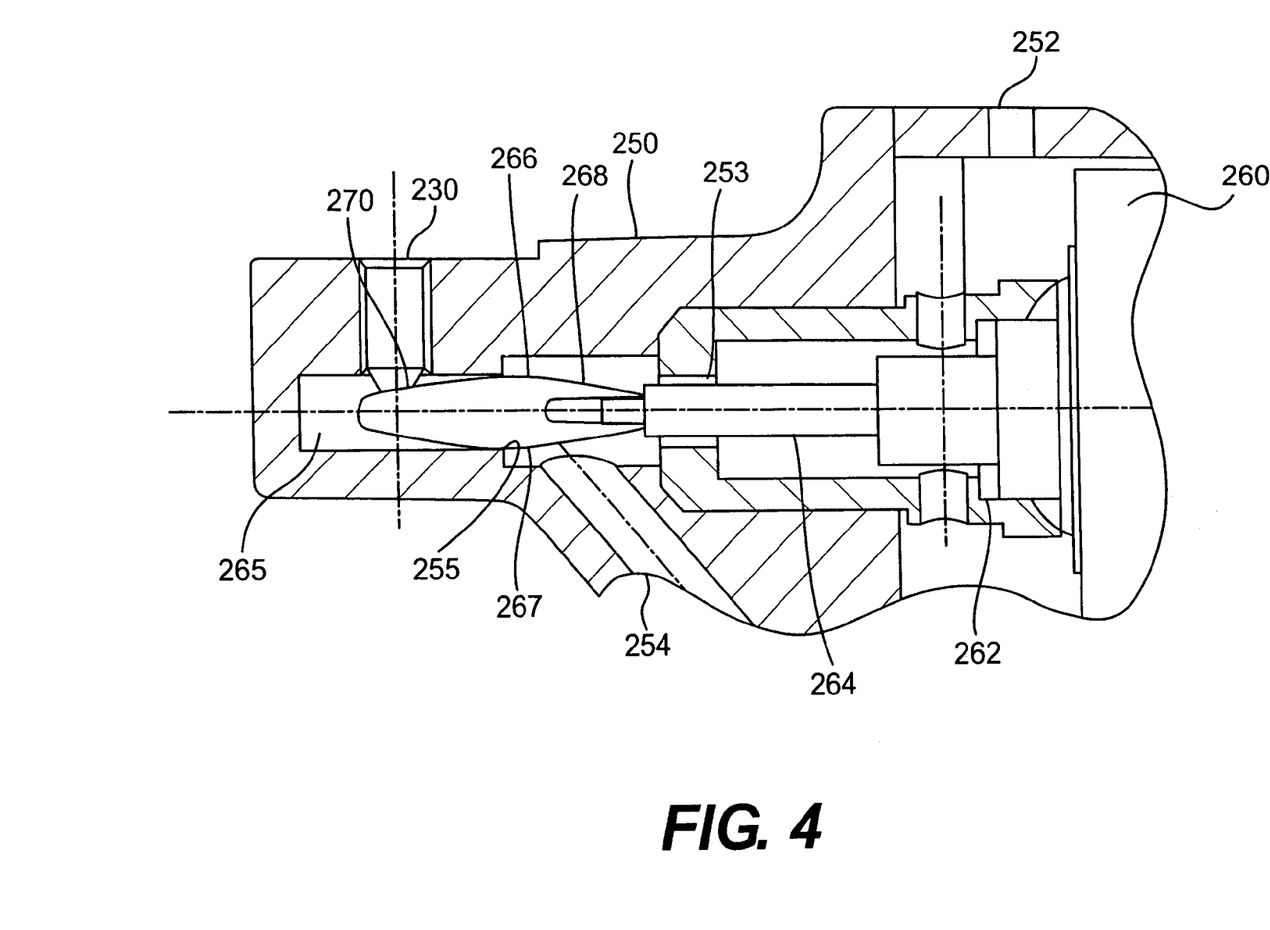
FIG. 4 is an enlarged detail of the needle valve illustrated in FIG. 3.

The operation of the valve needle will be described in reference to FIG. 4 which shows the valve needle 266 in greater detail. Reference also will be made to FIGS. 2 and 3. There are three positions of the needle valve 250. In a first position, shown in FIG. 4, the valve needle 266 closes the charge pressure $P_k$ duct 230. Specifically, conical end 270 closes, the opening 255 to thus close off the duct 230. The opening 253 to the atmosphere passage 252 is fully open and communicates with the diaphragm cell passage 254. Air is thus removed from the diaphragm cell air chamber 286. The diaphragm 284 is acted upon by atmospheric pressure ($P_m = P_u$) allowing the return spring 290 to close the waste gate 218. The charge pressure $P_k$ of the turbocharger increases.

In a second position (shown previously in FIG. 3), the valve needle 266 closes off the atmosphere passage 252 through the conical end 268 closing the opening 253. The charge pressure $P_k$ duct 230 is fully open. Accordingly, the full charge pressure $P_k$ acts on the diaphragm 284 ($P_m = P_k$), causing the diaphragm and, thus, the waste gate to move. The waste gate is opened completely, providing the compressor pressure is high enough.

In a third position (not shown), the valve needle 266 is between the extreme positions described in the first and second positions. Accordingly, the diaphragm cell passage 254 communicates with the charge pressure $P_K$ duct 230 and with the atmosphere passage 252. The valve needle 266 thus functions as a pressure splitter. The following relationship describes the gas pressure $p_M$ in the diaphragm cell: $P_k > P_m > P_u$. Accordingly, the waste gate is moved by the diaphragm cell to a position between the fully open and fully closed positions. It is, of course, possible to adjust the gas pressures $P_m$ to any pressure between the compressor pressure (charge pressure) $P_k$ and atmospheric pressure $P_u$. Accordingly, it is possible to achieve any position of the waste gate 218 between fully open and fully closed.

Returning to FIG. 2, a preferred embodiment of the stepper motor is shown. Stepper motor 260 is a double stepper motor, and, as such, comprises a stator with two electrically separate systems of windings 260A and 260B. Each system of windings comprises a winding or coil. The first system of windings are the primary windings of the motor 260A. The second system of windings 260B are a secondary system of windings. The windings are arranged around a common magnetic rotor. The connection to the valve needle may be formed by a spindle that is supported in the rotor through a spindle thread, and which would be attached rigidly to the valve needle at its other end. The spindle thread in this example would convert the rotary motion of the rotor into the linear motion of the valve needle.

Returning to FIG. 2, the two electrically separated winding systems are controlled from an ECU 298 through two largely independent lanes 298A and 298B. Each lane is essentially a fully operational ECU. Each lane is also galvanically isolated from other lanes. In other words, metallic connections between lanes are limited or omitted entirely. Thus, the system is redundancy-based. Should one control lane fail, the other lane takes over all the control functions, thereby significantly increasing flight safety. Even if there is a total failure of the valve-control system (failure of both control lanes or failure of the stepper motor 260), the system will still provide a very high degree of safety. In such a case, the last position of the valve (prior to the failure) is maintained. This is in contrast to the situation with respect to electromagnetic timing valves. Accordingly, abrupt changes in the charge pressure, together with the concomitant dangers (degraded performance, engine damage, etc.) can be avoided.

It should also be noted that more than two lanes can be used. If, for example, two lanes fail simultaneously, a third lane could assume the control functions performed by the two lanes that have failed. It is immediately apparent that security can be enhanced to any desired degree by adding extra lanes, although the associated costs will increase by an equal degree. It is understood that the lanes would preferably be galvanically isolated. In other words, there would be no metallic connection between the lanes. Finally, it is understood that the ECU and stepper motor arrangement described herein in reference to FIG. 2, also represents the preferable arrangement for the ECU and stepper motor used within the propeller governor control system that was described in reference to FIG. 1.

Figure 5:
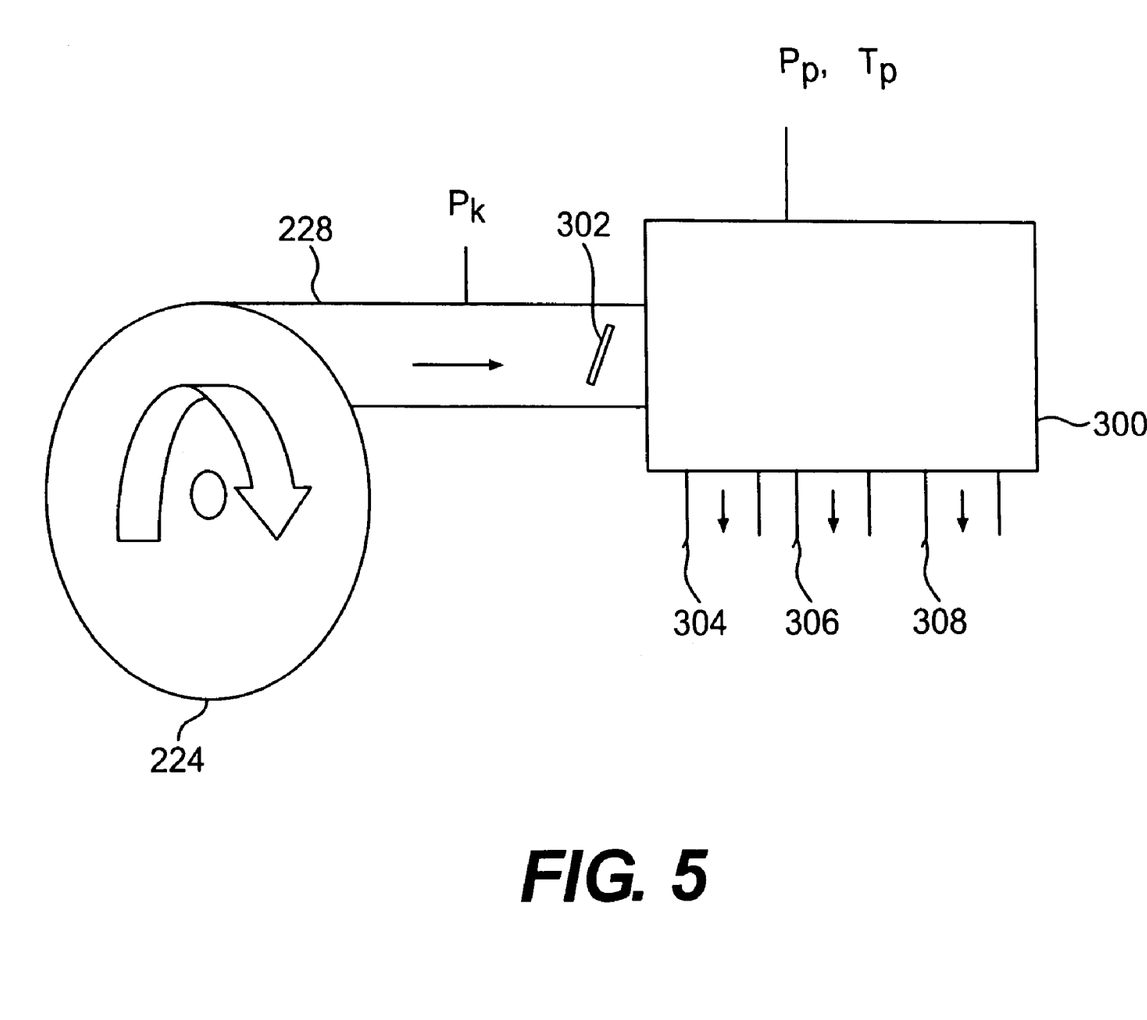
FIG. 5 is side view schematic of a plenum used in association with the turbocharger control system illustrated in FIG. 2.

FIG. 5 is a side view of a plenum 300 used in the turbocharger control system illustrated previously in FIG. 2. A throttle valve 302 is also shown within the air duct 228. Air passages 304, 306 and 308 extend from the plenum 300 to respective engine cylinders. A control mechanism or lever, as are known in the art, would be connected to the throttle valve 302. The control mechanism could also be the ECU.

Figure 6:
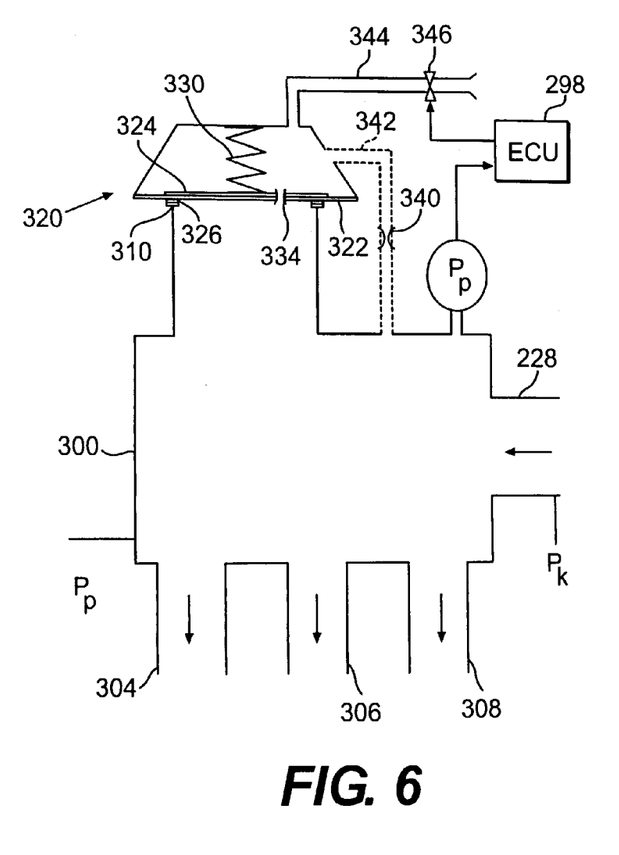
FIG. 6 is a schematic view of a diaphragm cell used in association with the turbocharger control system illustrated in FIG. 2, the diaphragm cell being shown in a first operational position.
Figure 7:
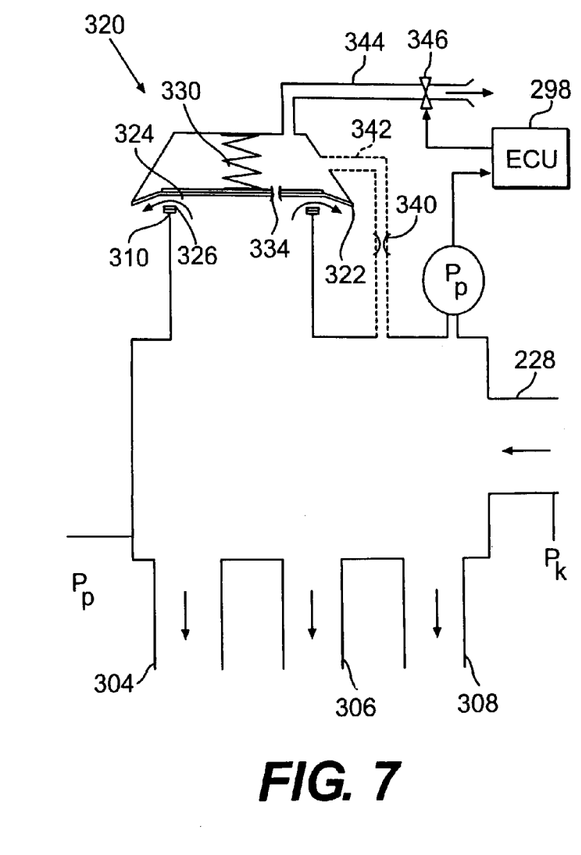
FIG. 7 is a schematic view showing the diaphragm cell illustrated in FIG. 6 in a second operational position.

Finally, FIGS. 6 and 7 show an additional feature of the turbocharger control system illustrated in FIG. 2, which is an overboost control. For reasons of safety, this device is desirable should the turbine control system fail, and the pressure $P_P$ in the plenum 300 and the associated engine output were to reach unacceptably high values. In principle, it would be possible to bleed off the excess pressure through a pop off valve arranged directly on the plenum 300. Because of the high gas throughput that is required, however, such valves would have to be very large. If such a valve were to be electrically operated, it would be necessary to provide a very significant source of power. The overboost control provided by the present invention overcomes these disadvantages.

FIG. 6 is a schematic view showing the features of a diaphragm cell 320, which operates as a plenum valve mechanism to provide overboost control. Diaphragm cell 320 is arranged on an opening 310 in the plenum 300. Diaphragm cell 320 comprises a diaphragm 322, a valve plate 324, a spring 330, and a choke 334. The spring 330 presses the valve plate 324 against the opening 310 in the plenum 300 and thereby closes it off. In order to minimize any leakage, a seal 326 is interposed between the valve plate 324 and the opening 310 in the plenum 300. The choke 334 in the valve plate connects the gas space in the plenum 300 with the gas space in the diaphragm cell 320. It would also be possible to install an external choke 340 in an external line 342 (indicated by dashed lines) in place of the choke 334. In either case, the external choke 340 or the internal choke 334 should have a sufficiently small diameter to provide a throttled (preferably, a slow) pressure equalization. An air bleed line 344 through which the air can escape from the diaphragm cell is connected to the diaphragm cell. The air-bleed line 344 can be opened and closed by an electrically switched valve (e.g., a solenoid valve) 346 actuated by the ECU 298. A pressure sensor, and temperature sensor (represented by $P_p$, $T_p$) continuously measure the pressure, and temperature in the plenum. These measurements would be communicated to the ECU through known means.

During normal operation, as shown in FIG. 6, the valve 346 and thus the air-bleed line 344 are closed. Accordingly the pressure $P_p$ in the plenum 300 and in the diaphragm cell 320 are equalized through the choke 334 or 340. The forces that are acting on the valve plate 324 as a result of the gas pressure cancel each other out, so that the only unequalized force acting on the plate 324 is applied by the spring 330. The spring force causes the valve plate 324 to seal the opening 310 in the plenum 300.

FIG. 7 shows the diaphragm cell 320 in a second operational mode where the pressure in the plenum 300 exceeds a predetermined threshold value and the ECU 298 has opened the valve 346. Pressurized gas is shown escaping from the diaphragm cell 320 to the atmosphere out the air bleed line 344. Consequently, the pressure within the diaphragm cell 320 drops. As a consequence, the force exerted by the gas in the plenum 300 against the closing force of the spring 330 builds up, which forces the valve plate 324 off the plenum opening, allowing excess charge pressure to escape to the atmosphere. The pressure in the diaphragm cell 320 can be set within very wide limits by periodic actuation of the valve 346 (timing valve), because the cross section of the opening of the valve 346 is greater than the clear opening of the choke 334 or 340. In this way, it has been made possible to vary the threshold value for the charge pressure in a very simple manner.

Figure 7A:
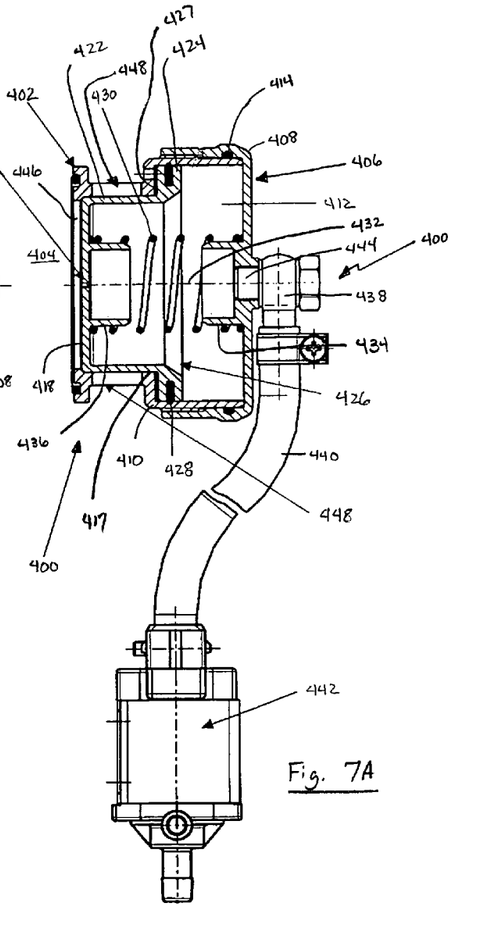
FIG. 7A is a side view, partial cross-section of a pop-off valve constructed according to the teachings of the present invention.
Figure 7B:
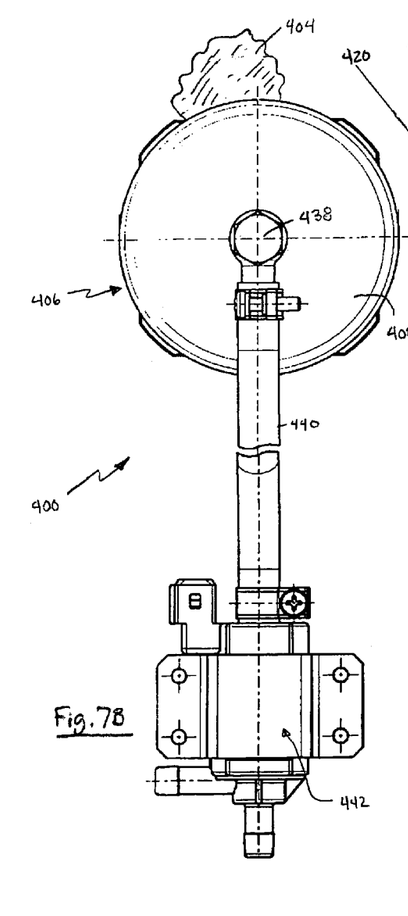
FIG. 7B is a top view of the pop-off valve illustrated in FIG. 7A.

Referring to FIG. 7A, another preferred embodiment of our inventive overboost control is illustrated. FIGS. 7A and 7B illustrate two views of a pop-off valve 400 that provides improved safety because it prevents an overboost should the turbine control system fail. The pop-off valve 400 relieves pressure in a pressure medium to accomplish this result, among others. The pop-off valve 400 is particularly useful for a drive line comprising an engine and a pressure pump (or charger).

According to this preferred embodiment, the pop-off valve 400 is controlled by a control device, such as the ECU, and serves for draining off part of the charged air (pressure medium) in case of an emergency. The pop-off-valve 400 can be connected to the intercooler, the plenum, an air passage, or any combination of the three, among others. According to another preferred embodiment, the pop-off valve 400 may be fastened, preferably by an attachment fitting 402, with a coupled component, which may be a portion of a drive device. The coupled component may be one of the intercooler, the plenum, and/or the air passage, for example. The location of the coupled component is designated 404 in FIG. 7A and a portion of the coupled component is depicted in FIG. 7B. Alternatively, as would be appreciated by those skilled in the art, the pop-off valve 400 may be connected via other suitable connectors or fittings, too numerous to list here. It is contemplated, therefore, that the scope of the present invention is not limited solely to the connectors or fittings described herein. Regardless of the manner in which the connection is made, the pop-off valve 400 communicates with the pressure of the coupled component.

The pop-off valve has a housing 406 including a first housing portion 408 and a second housing portion 410. The two housing portions 408, 410 interconnect with one another and form a valve chamber 412 therein. At least one seal 414 is disposed between the housing potions 408, 410 to form the pressure-tight valve chamber 412. A piston 416 is slidingly disposed within a bore 417 within the valve chamber 412. The piston 416 includes a crown 418 with an opening 420 therethrough, permitting pressure to equalize between the valve chamber 412 and the coupled component 404. As discussed in connection with the external choke 340 and the internal choke 334, the opening 420 should be sufficiently small (i.e., have a small diameter) to provide a throttled pressure equalization. The throttled pressure equalization preferably is slow, meaning that the pressure equalization is not instantaneous.

The piston 416 has two portions, a smaller diameter portion 422 and a larger diameter portion 424, which are connected to one another via a step 426. The piston 416 sealingly engages the interior surface of the bore 417 of the valve chamber 412 via one or more seals 428. To accommodate the step 426, the bore 417 includes a lip 427 therein, which defines a transition between smaller and larger diameter sections of the valve chamber. The lip 427 also acts as a stop for the piston 416, when the piston 416 closes the valve chamber 412.

The piston 416 is biased by a spring 430 so that the piston 416 engages the portion of the housing 406 having the fitting 402. This is the "closed" position of the piston 416, which is the position of the piston 416 during normal operation. The spring 430 engages the interior of the first housing portion 408 at one end and the interior of the piston 416 at the other end. To maintain the spring 430 in a centered position on the centerline 432 of the housing 406, the first housing portion 408 includes a protrusion 434 that extends into the valve chamber 412 from the interior surface of the first housing portion 408. Similarly, a protrusion 436 extends into the valve chamber 412 from the interior surface of the piston 416. The two protrusions 434, 436 are disposed along the centerline 432 of the housing 406, as illustrated in FIG. 7A.

A connector 438 also is positioned along the centerline 432 of the housing 406. The connector 438 has a conduit or hose 440 that extends to a control valve 442 disposed apart from the housing 406. The control valve 442 preferably is a three-way valve.

The first housing portion 408 defines an opening 444 therein. The connector 438 attaches to the first housing portion 408 at the location of the opening 444 to define a passage from the valve chamber 412 to the hose 440. The second housing 410 defines an opening 446 therein, axially disposed apart from the first opening 444 along the centerline 432 of the housing 406. The crown 418 of the piston 416 is disposed within the opening 446 and provides a pressure barrier between the coupled component 404 and the valve chamber 412. The second housing 410 also includes one or more radial openings 448 therethrough, at one or more positions adjacent to the attachment fitting 402 that surrounds the second opening 446 in the second housing portion 410.

The operation of the pop-off valve 400 is described below in connection with FIGS. 7A and 7B. It should be noted, however, that the pop-off valve 400 may have any number of configurations and is not limited to the configuration illustrated in FIGS. 7A and 7B. In particular, for example, the control valve 442 may be integrally formed with the housing 406 to provide a more compact arrangement, if desired.

During an overboost control event, a pressure equalization between the coupled component 404 and the valve-chamber 412 is established by the opening 420 in the crown 418 of the piston 416. As discussed above, according to a preferred embodiment of the pop-off valve 400, the piston 416 is provided with a larger diameter portion 424 and a smaller diameter portion 422 connected to one another by a step 426. With this construction, the smaller diameter portion 422 of the piston 416 is in contact with the medium within the coupled component 404 and the larger diameter portion 424 is in contact with the medium within the valve chamber 412. Hence, due at least in part to the larger piston surface on the inside of the valve-chamber 412, the piston 416 remains closed despite being exposed to varying pressures. This also provides the advantage that a weaker spring 430 may be used by comparison with a spring 430 that would be needed if the interior and exterior surfaces of the piston 416 presented equal surface areas. Of course, as would be appreciated by those skilled in the art, a piston 416 with equal surface areas on both sides (and a stronger spring 430) may be employed without departing from the scope of the present invention.

When the pressure in the coupled component exceeds a predetermined threshold value, the control valve 442 opens and ventilates the valve chamber 412. In response to the increased pressure, the piston 416 moves toward the first housing portion 408, due to the established pressure difference between the valve chamber 412 and the coupled component 404. It should be noted that the opening 420 in the crown 418 of the piston is of a sufficiently small diameter to prevent a rapid or instantaneous equalization of pressure within the coupled component 404 and the valve chamber 412. This permits the control valve 442 to ventilate the valve chamber 412.

As may be appreciated from the drawings, the piston 416 moves against the spring force applied by the spring 430. When the piston 416 moves against the force applied by the spring 430, at least a part of the charged air from the coupled component 404 escapes through one or more of the radial openings 448 in the housing 406 of the pop-off valve 400 until a pressure equalization is established between the valve chamber 412 and the coupled component 404.

According to different embodiments of the present invention the overboost control valve 400 can be mounted so as to be coupled with the intercooler or the plenum or any other component communicating with them. According to a especially preferred embodiment of the present invention, the overboost control valve is mounted on or before or after the intercooler. In addition, two or more valves 400, each with separate conduits 440 may be employed. It is contemplated that relying on two valves 400 would provide redundancy, should one of the valves 400 fail during operation. As would be appreciated by those skilled in the art, this increases the reliability of the drive device.

According to a further task and function of the described overboost safety valve 400, the valve 400 can also by used to drain abrupt pressure rises resulting from backfire through the coupled component 404. Therefore, when the pop-off valve 400 is positioned as close-by as possible to the cylinder of the engine, the pop-off valve 400 offers the additional advantage because it stops backfires efficiently and effectively.

Since the ECU is connected to the control valve 442, the ECU may also reduce the pressure in the valve chamber 412 during operation of the engine. In this manner, the ECU, by reducing the pressure in the valve chamber 412, controls the operation of the piston 416 by controlling the predetermined threshold pressure (a reference force) needed to actuate the piston 416. Similarly, if desired, the ECU may increase the pressure in the valve chamber 412 to inhibit operation of the pop-off valve 400, when desired.

To control the reference force, the ECU, which is a control device, receives at least one signal corresponding to at least one operating parameter of the drive device. In response to that signal, the ECU controls the reference force to which the second side of the piston 416 (a pressure body) is exposed. The operating signal processed by the ECU may be one of any number of signals including, but not limited to:

ambient air temperature, ambient air pressure, pressure of the pressure medium, pressure of the pressure medium in the plenum, pressure of the pressure medium in the intercooler, pressure of the pressure medium in the air passage, pressure of the pressure medium in the intake manifold, temperature of the pressure medium, temperature of the pressure medium in the plenum, temperature of the pressure medium in the intercooler, temperature of the pressure medium in the air passage, temperature of the pressure medium in the intake manifold, temperature of the internal combustion engine, rotational speed of the internal combustion engine, and vibrational characteristics of the internal combustion engine. As would be appreciated by those skilled in the art, this list is not intended to be exhaustive of the large number of operating signals that may be fed to the ECU. This list, therefore, is meant to be exemplary only.

After the detected operating parameter signal is received by the ECU, the control device compares the value of the detected operating parameter signal with a schedule (or table) of predetermined values and sets the reference force in accordance with the schedule (or look-up table). As would be appreciated by those skilled in the art, the predetermined values in the look-up table are selected (or determined) according to the operating status of the drive device. The look-up table is stored in a memory unit of the control device and provides a readily-accessible set of control parameters. Of course, as would be appreciated by those skilled in the art, the memory unit may include several schedules (or look-up tables) for a variety of operating parameter signals. Collectively, the various tables may be selectively consulted by the control device, dependent on the operating parameter signal(s), to control the reference force. As discussed, one way to control the reference force is by controlling the pressure within the valve chamber 412. As would be appreciated by those skilled in the art, the control valve 400 opens and closes to change the pressure within the valve chamber 412 based on the detected operating parameter signal and the predetermined value(s) in the look-up tables in the memory unit of the control device. When the control valve 400 is opened, the pressure in the valve chamber 412 is altered. When the control valve 400 is closed, the pressure in the valve chamber 412 eventually becomes equal to the pressure of the pressure medium, via the opening 420, for example.

In the discussion above, the control device is described with reference to one or more look-up tables. As would be appreciated by those skilled in the art, the control device may operate by calculating the values needed to control the valve 400. In addition, alternatively, the control device may operate by a hybrid functionality, relying on look-up tables in-part and in relying in-part on calculation of the value or values.

Figure 8:
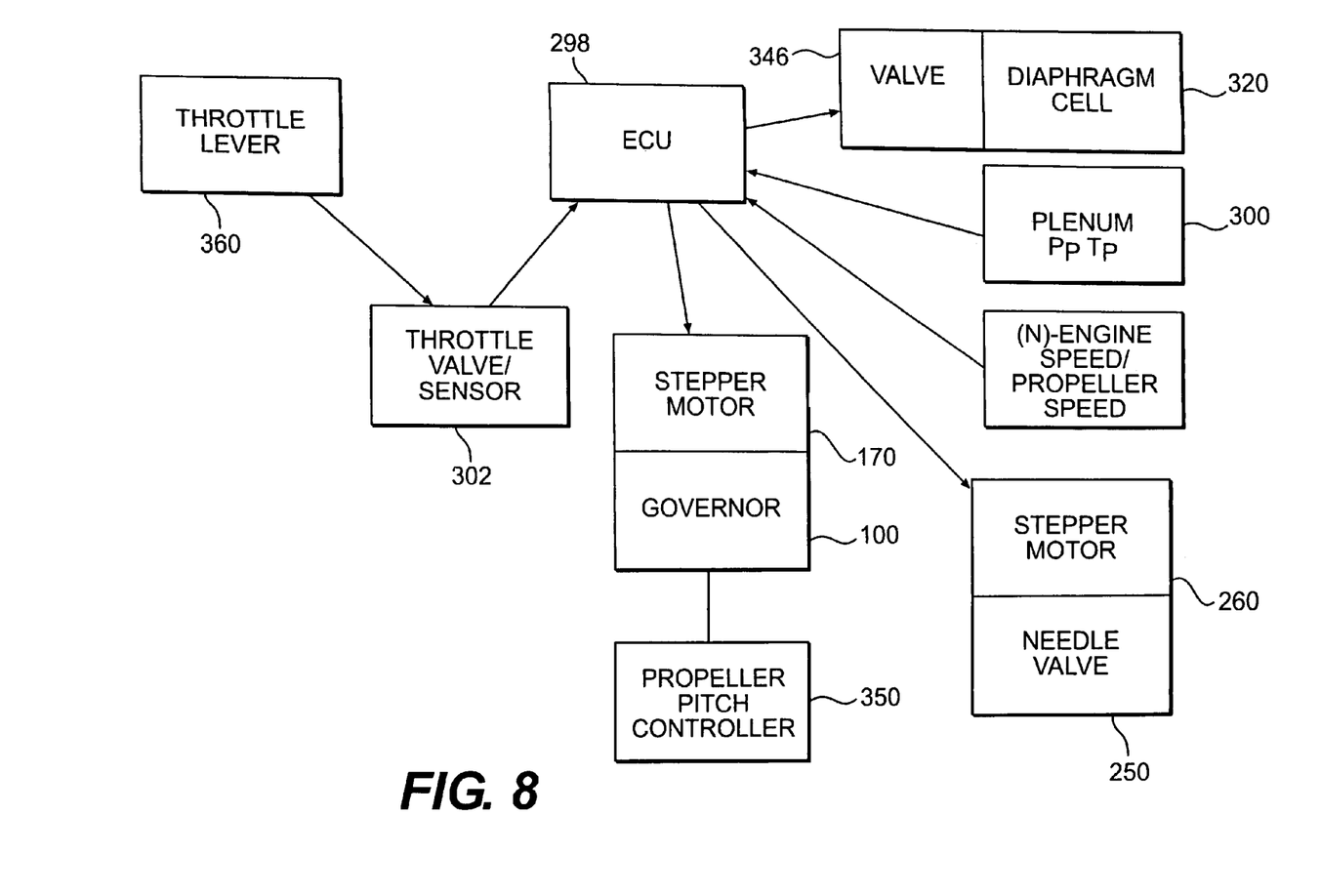
FIG. 8 is a schematic view showing the operational control system of the present invention.

FIG. 8 is a schematic view of the control loop of the present invention. Referring to FIGS. 2–8, the control loop for the turbo charger control system is as follows.

In a first control loop for the turbo charger control system, the pressure $P_p$, and the temperature $T_P$ in the plenum 300 are measured through known sensors communicating with the ECU. From the measured values $P_p, T_P$, the density of the air $\rho_p$ within the plenum is calculated by the ECU. Additionally, the throttle valve position is also measured by a known throttle valve position sensor. The throttle valve position is communicated to the ECU. The ECU, through a process known as mapping computes the desired density $\rho_{p(desired)}$ for the throttle valve position. The desired density $\rho_{p(desired)}$ is compared to the actual density as calculated by the measured values $P_p, T_P$. An actuating variable that is determined from the control differential (actual value–desired value) is computed by a control algorithm. From this actuating variable the ECU calculates the adjustment required at the stepper motor 260, and the controller output necessary to produce the adjustment required. The controller output of the ECU is communicated to the stepper motor.

In a simpler, second version of the control loop, the pressure $P_p$ in the plenum 300 is measured through a sensor communicating with the ECU. Additionally, the throttle valve position is also measured by a known throttle valve position sensor. The throttle valve position is communicated to the ECU. The ECU through mapping computes the desired pressure $P_{p(desired)}$ for the throttle valve position. An actuating variable that is determined from the control differential (actual value–desired value) is computed by a control algorithm. From this actuating variable the ECU calculates the adjustment required at the stepper motor 260, and the controller output necessary to produce the adjustment required. The controller output of the ECU is communicated to the stepper motor.

In keeping with the ECU 298 that operates according to the redundancy principle, the position of the throttle valve 302, acquired by a throttle-valve position sensor (not shown) is typically duplicated (or replicated several times) in order to ensure the required degree of redundancy in the system. The same applies to the pressure sensor and temperature sensor (not shown) that is used to determine the pressure $P_P$, and temperature $T_p$ in the plenum 300.

An important feature of the control loop is its stable behaviour as a regulator, which is explained in greater detail below on the basis of examples.

It is assumed that the throttle valve 302 is largely closed. If the throttle valve 302 is now opened abruptly, on the basis of the mapping the ECU 298 will call for a higher charge-air density $\rho_p$ in the plenum 300 or for a higher pressure $P_P$ in the plenum 300. The charge pressure $P_K$ at the compressor 224 will drop very rapidly because of the abrupt opening of the throttle valve 302. However, as can be seen in FIG. 2 and FIG. 3, this drop in pressure also causes a corresponding and simultaneous drop in the gas pressure $P_m$ in the diaphragm cell 280 (assuming a constant position of the needle valve 250), so that the force exerted by the spring 290 against the pressure of the gas $P_m$ causes the waste gate 218 to close. Because of this closing of the waste gate 218, an increased amount of gas is admitted to the turbine so that the turbocharger output pressure $P_k$ increases. This ultimately leads to the desired increase in the charge-air density $\rho_p$ in the plenum 300. Analogously stable behaviour is achieved when the throttle valve 302 is closed abruptly.

This tendency to self-regulation also occurs when the aircraft changes altitude, i.e., when the pressure of the air outside the aircraft changes. If, for example, the turbo control system fails at a cruising altitude (e.g., 3000 metres), the controlled condition that was last set up will initially remain unchanged due to the way the waste gate 218 is controlled by the diaphragm cell 280, needle valve 250, and stepper motor 260, as has been described above. If the altitude at which the aircraft is flying is then changed, the charge pressure $P_k$ and thus the engine output remain more or less constant since, as the altitude increases, the pressure $P_m$ in the diaphragm cell 280 will decrease in proportion to the drop in the pressure $P_u$ of the air outside the aircraft. This results in the waste gate 218 being closed, and a corresponding increase in the compressor output. Analogous albeit opposite behaviour will occur when the altitude is decreased or when the pressure $P_u$ of the air outside the aircraft increases.

The control loop for the propeller governor 100 is shown in FIG. 8 operates as follows.

The controlled variable is the propeller speed (not shown), the actual value of which is measured by a double (redundancy-based) speed sensor. This actual value is compared to the desired speed value in the ECU 298. The desired value is determined by mapping, as in the case of the turbo control system, which is to say that a specific desired speed value is associated with every position of the throttle valve. A controller output that is determined from the control differential (actual value–desired value) is computed within the ECU by a control algorithm, and this is applied to the stepper motor 170. Thus, there are two control loops, one is the hydraulic-mechanical control loop through which the governor controls the propeller pitch control mechanism, the other is the electrical control loop of the ECU 298, through which the ECU 298 controls the governor. The electrical control loop relieves the pilot of having to constantly monitor the speed of the propeller.

In principle, different algorithms can be used as the control algorithm. Such algorithms include both linear algorithms (e.g., PID controller) as well as non-linear ones. Particularly advantageous for the present control task (propeller and turbo control) are controller systems that are based on fuzzy-logic architecture, which are comparatively robust and immune to changes in the controlled system, and, in which human "operator knowledge" can be incorporated.

In summary, one important advantage of the present invention is that to a very large extent the pilot is relieved of control tasks, so that flying comfort is greatly enhanced. The pilot now has to operate only one control lever, namely the throttle control 360, which may be linked directly to the throttle valve 302. Using mapping, the ECU 298 determines the desired value for the propeller speed and the charge-air density $\rho_p$ or the charge pressure $P_p$ in the plenum 300 and the actual value is automatically brought up to this desired value by the control processes. In principle, various strategies can be applied in order to generate the mapping. In particular, strategies that are oriented towards the maximum of the total efficiency (engine efficiency x propeller efficiency) are generally preferred. But, it is also possible to take influential factors that affect the aircraft into account. For example, the drag generated by the aircraft as a function of the aircraft's indicated air speed, and/or the aircraft's stall speed could be invoked.

There are at least two further advantages of the present invention. First, the control valve 400 may operate as a secondary waste gate. If so, if the primary waste gate fails, or pressure oscillations (or pulses occur), the pressure may be relieved in a controlled manner according to the operating condition of the engine (e.g., according to the function of the ECU or control device). Second, the valve 400 may operate as a safety valve. If the pressure of the pressure medium rises rapidly, if pop off control fails, pressure equalization via the choke 334, 340, 420 will not occur rapidly enough, thereby causing the valve 400 to open and release pressure in the pressure medium. In other words, even without the control device, the valve 400 will operate to relieve pressure in the pressure medium.

Although at least one preferred embodiment of the invention has been described herein, it is understood by those skilled in the art that various changes may be made and equivalents may be substituted for elements thereof without departing from the spirit and scope of the present invention. In addition many modifications may be made to adapt a particular situation, component, or material to the teachings of the present invention without departing from its teachings as claimed.

What is claimed is:

1. A process for controlling pressure in a drive device, comprising:
    providing a pop-off valve, comprising a housing adapted for connection to a portion of the drive device containing a pressure medium and a pressure body movably disposed in the housing such that, in operation, a first side of the pressure body is exposed to the pressure medium while a second side is exposed to a reference force;
    receiving, via a control device, at least one signal concerning at least one operating parameter of the drive device and, in response to the operating parameter signal, controlling the reference force; and
    exposing, as a result of movement of the pressure body within the housing, at least one first opening in the housing, thereby permitting venting of the pressure medium.

2. A process of claim 1, further comprising:
    comparing, via the control device, a value of the at least one operating parameter signal to a predetermined value and controlling the reference force accordingly.

3. A process of claim 2, wherein the control device comprises a drive device control unit and wherein the predetermined value is selected with respect to a drive device status and is retrieved from a memory unit of the drive control unit.

4. A process of claim 2, wherein the at least one operating parameter signal comprises the pressure of the pressure medium.

5. A process of claim 1, wherein the housing defines a valve chamber on the second side of the pressure body and wherein the reference force is at least partially controlled by controlling the pressure inside the valve chamber.

6. A process of claim 5, wherein the pop-off valve further comprises a pressure equalization opening for throttled pressure equalization between the valve chamber and the pressure medium.

7. A process of claim 5, wherein the control device comprises a control valve connected to the valve chamber, the control valve being operated with respect to the difference between the predetermined value and a value of the at least one operating parameter signal to control the pressure inside the valve chamber.

8. A pop-off valve for relieving pressure in a pressure medium, comprising:
    a housing adapted for connection to a portion of a drive device containing the pressure medium;
    a pressure body movably disposed in the housing such that, in operation, a first side of the pressure body is exposed to the pressure medium while a second side is exposed to a reference force; and
    a control device adapted to receive at least one signal concerning at least one operating parameter of the drive device and, in response to the operating parameter signal, to control the reference force,
    wherein, as a result of movement of the pressure body within the housing, at least one first opening in the housing is exposed, permitting venting of the pressure medium.

9. The pop-off valve of claim 8, wherein the housing defines a valve chamber and the control device comprises a control valve operatively connected to the valve chamber to control the pressure of the pressurized medium therein, thereby controlling the reference force.

10. The pop-off valve of claim 9, wherein the control valve is normally closed.

11. The pop-off valve of claim 9, further comprising:
a pressurized medium conduit connecting the valve chamber to the control valve.

12. The pop-off valve of claim 9, wherein:
when the control valve lowers the pressure of the pressurized medium within the valve chamber, the pressurized medium within the portion of the drive device acts on the pressure body to push the pressure body into the valve chamber, and
when the pressure body moves to a position where the at least one first opening is exposed, the pressurized medium exits from the bore through the at least one first opening.

13. The pop-off valve of claim 8, wherein the drive device comprises an internal combustion engine.

14. The pop-off valve of claim 13, wherein the internal combustion engine is adapted for use in an aircraft.

15. The pop-off valve of claim 13, wherein the at least one operating parameter is selected from a group comprising: ambient temperature, ambient air pressure, pressure of the pressure medium, temperature of the pressure medium, temperature of the internal combustion engine, rotational speed of the internal combustion engine, and vibrational characteristics of the internal combustion engine.

16. The pop-off valve of claim 13, wherein the portion of the drive device is selected from a group comprising: a plenum, an intercooler, an air passage, and an intake manifold.

17. The pop-off valve of claim 16, wherein the at least one operating parameter is selected from a group comprising: ambient air temperature, ambient air pressure, pressure of the pressure medium, pressure of the pressure medium in the plenum, pressure of the pressure medium in the intercooler, pressure of the pressure medium in the air passage, pressure of the pressure medium in the intake manifold, temperature of the pressure medium, temperature of the pressure medium in the plenum, temperature of the pressure medium in the intercooler, temperature of the pressure medium in the air passage, temperature of the pressure medium in the intake manifold, temperature of the internal combustion engine, rotational speed of the internal combustion engine, and vibrational characteristics of the internal combustion engine.

18. The pop-off valve of claim 8, further comprising:
an attachment fitting on the housing, disposed around a second opening in the housing, permitting the housing to be attached to the drive device; and
a spring disposed between the housing and the pressure body, the spring biasing the pressure body into engagement with the second opening.

19. The pop-off valve of claim 18, wherein:
the housing defines a valve chamber, a third opening into the valve chamber, and a bore,
the second opening is disposed at one end of the bore adjacent to the at least one first opening,
the pressure body is disposed within the bore, and
the third opening permits the pressurized medium to fill the valve chamber by throttled pressure equalization.

20. The pop-off valve of claim 19, wherein the control device comprises a control valve operatively connected to the valve chamber to control the pressure of the pressurized medium therein, thereby controlling the reference force.

21. The pop-off valve of claim 20, wherein the control valve is normally closed.

22. The pop-off valve of claim 18, wherein:
the housing defines a valve chamber and a bore,
the second opening is disposed at one end of the bore adjacent to the at least one first opening,
the pressure body is disposed within the bore,
the pressure body comprising a crown defining a third opening therethrough, permitting the pressurized medium to fill the valve chamber by throttled pressure equalization.

23. The pop-off valve of claim 22, further comprising:
a pressurized medium conduit connecting the valve chamber to the control valve.

24. The pop-off valve of claim 22, wherein the control device comprises a control valve operatively connected to the valve chamber to control the pressure of the pressurized medium therein, thereby controlling the reference force.

25. The pop-off valve of claim 24, wherein the control valve is normally closed.

26. The pop-off valve of claim 22, wherein the pressure body comprises a piston.

27. The pop-off valve of claim 26, wherein the piston further comprises:
a smaller diameter portion;
a larger diameter portion; and
a step connecting the smaller diameter portion to the larger diameter portion,
wherein the bore defines a lip that acts as a stop for the piston when the piston seals the second opening.

28. The pop-off valve of claim 22, wherein:
when the control valve lowers the pressure of the pressurized medium within the valve chamber, the pressurized medium within the portion of the drive device acts on the crown of the pressure body to push the pressure body into the valve chamber, and
when the crown of the pressure body moves to a position where the at least one first opening is exposed, the pressurized medium exits from the bore through the at least one first opening.

29. The pop-off valve of claim 28, wherein:
the housing defines a central axis and the piston travels along the central axis,
the second opening is positioned on the central axis, and
the at least one first opening is disposed through the bore at a radial position from the central axis.

* * * * *